UNITED STATES PATENT OFFICE.

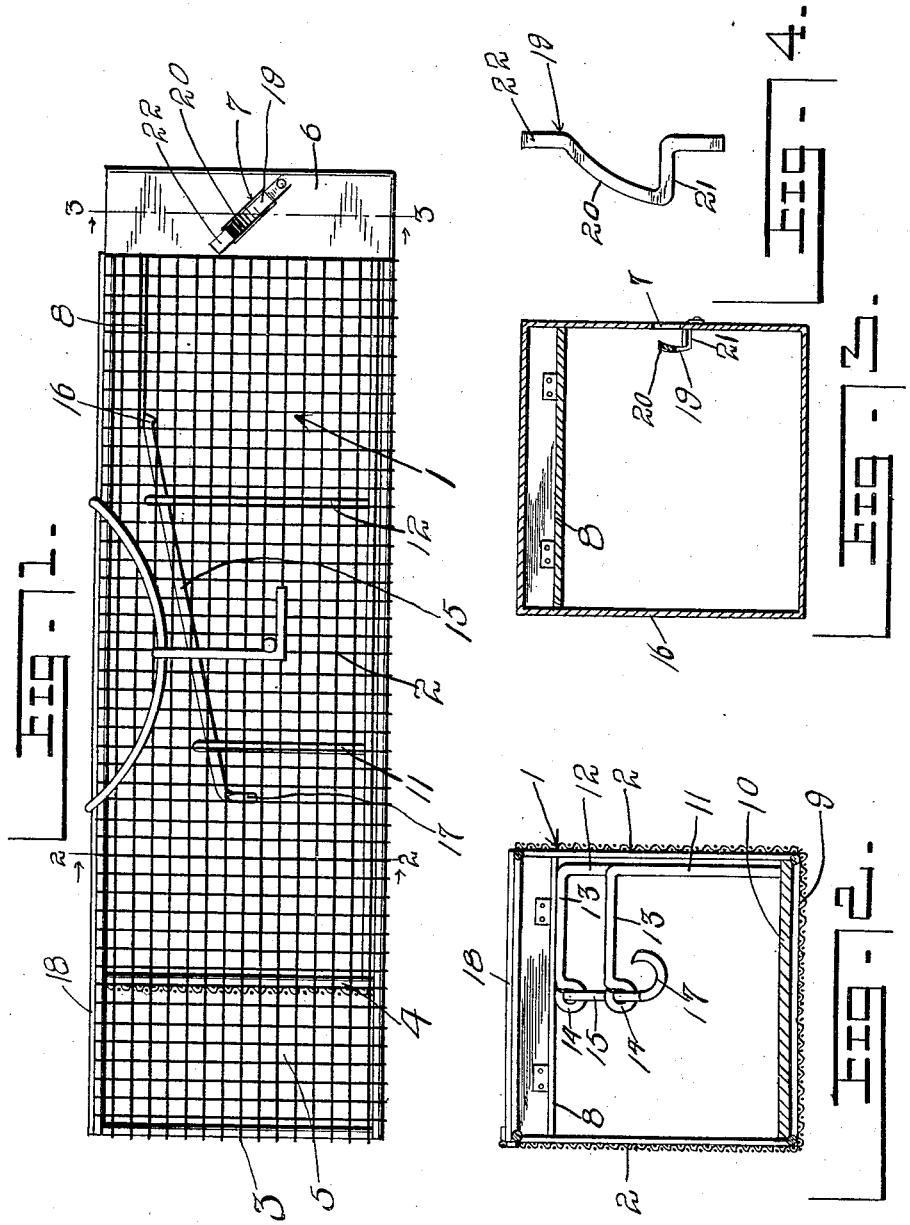

JACOB G. STOLL, OF ORRVILLE, OHIO.

TRAP.

1,077,567.　　　　Specification of Letters Patent.　　Patented Nov. 4, 1913.

Application filed January 28, 1913. Serial No. 744,734.

*To all whom it may concern:*

Be it known that I, JACOB G. STOLL, a citizen of the United States, residing at Orrville, in the county of Wayne, State of Ohio, have invented certain new and useful Improvements in Traps; and I do hereby declare the following to be a full, clear, and exact description of the invention, such as will enable others skilled in the art to which it appertains to make and use the same.

The present invention is directed to improvements in animal traps, and has for its object to construct a device of this type with a novel form of trip.

A further object of the invention is to provide a trap of this type so constructed that when the door has been actuated by the trip, the same will be positively closed so as to prevent possible escape of the animal.

With these and other objects in view, this invention resides in the novel features of construction, formation, combinations and arrangements of parts to be hereinafter more fully described, claimed and illustrated in the accompanying drawing, in which:—

Figure 1 is a side elevation of the trap, showing the same previous to the actuation of the tripping mechanism. Fig. 2 is a sectional view on line 2—2 of Fig. 1. Fig. 3 is a similar view on line 3—3 of Fig. 1. Fig. 4 is a side elevation of the spring.

Referring to the drawing, the numeral 1 designates a box like structure having its side walls 2, and end wall 3 formed from wire mesh, a wire mesh partition 4 being mounted interiorly of the structure 1 and is spaced from the wall 3 so as to provide a bait compartment 5. Connected to one end of the trap 1 is a sheet metal hood 6 having formed in one of its sides a slot 7, the purpose of which will appear later. Hingedly mounted in the hood 6 is a door 8 which is of such size that it may be freely swung in the hood so that it may be set to permit the animal to enter the trap. Mounted upon the bottom 9 of the trap is a plate 10 having rising therefrom alined posts 11 and 12, the upper ends of which terminate in lateral arms 13, the arms 13 terminating in eyes 14, said eyes being arranged in alinement but upon different planes owing to the fact that the post 11 is shorter than the post 12. Slidably mounted in the eyes 14 is a trip rod 15, the outer end of which is formed with a downwardly curved portion 16, and upon which the free edge of the door 8 rests when the trap is in its set position. The inner end of the rod 15 terminates in a right angle hook 17 and upon which the bait is placed. Hingedly connected to one of the side walls 2 of the trap is a sheet metal cover 18 which is operable to permit access to the interior of the trap, so as to set the same or remove the trapped animal therefrom, said cover also serving to close the bait compartment 5. Having one end fixed to one side of the hood 6 is a leaf spring 19, said spring being provided with a curved portion 20 which passes through the slot 7 of the hood 6 and assumes a position interiorly of the hood 6 and in the path of one edge of the door 8. By providing the spring 19 with the curved portion 20 a shoulder 21 is produced which is engaged by the door when the same has been released and is in its closed position, thus positively holding the door closed. The spring 21 may be removed from engagement with the door 8 upon grasping of the end 22 thereof which is arranged exteriorly of the hood 6.

When it is desired to set the trap the cover is lifted and the door 8 is arranged so that its free edge will rest upon the curved portion 16 of the rod 15, thus holding the door in its open position. The animal enters the trap and in its attempt to obtain the bait from the hook 17, the rod 15 is rocked, which rocking movement causes the same to move rearwardly, owing to the inclination of the eyes 14, thus permitting the door to disengage the curved portion 16 and by gravity will swing closed and will be held closed by the spring 19.

By providing the compartment 5 bait may be placed therein in sufficient quantity to entice the animal from some distance to the trap.

What is claimed is:—

An animal trap comprising a box like structure, a hood carried by one end of the structure, a door pivotally mounted in the hood, a plate mounted upon the bottom of the trap, alined posts rising from the plate and having their upper ends terminating in lateral arms, eyes formed upon the ends of the arms and arranged upon different planes, a trip rod mounted for rocking and sliding movement in the eyes, the inner ends of said rod being provided with a bait hook arranged at right angles to the rod, the outer end of said rod being provided with a downwardly curved portion adapted to engage the door to hold the same open, said rod being adapted to be rocked when lateral movement is imparted to the bait hook, thereby causing the same to slide forwardly, so that the curved end thereof disengages the door to permit the same to close the hood, and means carried by the hood to engage the door to hold the same positively closed.

In testimony whereof, I affix my signature, in the presence of two witnesses.

JACOB G. STOLL.

Witnesses:
C. D. SWAN,
A. J. HELLER.

Copies of this patent may be obtained for five cents each, by addressing the "Commissioner of Patents, Washington, D. C."